US012769639B2

(12) United States Patent
Shen et al.

(10) Patent No.: US 12,769,639 B2
(45) Date of Patent: Oct. 20, 2026

(54) METHOD FOR EFFICIENTLY IMPROVING TEST CASE COVERAGE AND ROBUSTNESS

(71) Applicant: Dell Products L.P., Round Rock, TX (US)

(72) Inventors: Xiaowei Shen, Shanghai (CN); Qin Zhang, Shanghai (CN); Celine Ling Xu, Shanghai (CN); Jin Qin, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/175,662

(22) Filed: Feb. 28, 2023

(65) Prior Publication Data

US 2024/0241815 A1 Jul. 18, 2024

(30) Foreign Application Priority Data

Jan. 16, 2023 (CN) ......................... 202310073069.6

(51) Int. Cl.
*G06F 11/3668* (2025.01)
*G06F 8/71* (2018.01)

(52) U.S. Cl.
CPC ............ *G06F 11/3684* (2013.01); *G06F 8/71* (2013.01); *G06F 11/3688* (2013.01)

(58) Field of Classification Search
CPC ..... G06F 11/3684; G06F 11/3688; G06F 8/71
See application file for complete search history.

(56) References Cited

U.S. PATENT DOCUMENTS 6,701,460 B1 * 3/2004 Suwandi ............. G06F 11/2215 717/124
7,757,215 B1 * 7/2010 Zhou ................... G06F 11/3644 717/124
8,276,123 B1 * 9/2012 Deng .................... G06F 11/368 717/124

(Continued)

OTHER PUBLICATIONS

Kormann, Benjamin, and Birgit Vogel-Heuser. "Automated test case generation approach for PLC control software exception handling using fault injection." IECON 2011—37th Annual Conference of the IEEE Industrial Electronics Society. IEEE, 2011. (Year: 2011).*

(Continued)

*Primary Examiner* — Joanne G Macasiano
(74) *Attorney, Agent, or Firm* — Jackson Walker L.L.P.

(57) ABSTRACT

Disclosed methods for selecting test cases determine differences between first and second versions of firmware. The first version may correspond to a version currently in use while the second version represent an update to the first version, including one or more bug fixes and/or additional features. Based at least in part on the differences between the two versions, one or more functions most likely to be impacted by the update are identified. Disclosed methods and system may then modify binary code for the second firmware version to cause the one or more impacted functions, when called, to return unconditionally a predetermined error value. With the firmware thus modified, a plurality of test cases are executed one time. Any test cases failing with the appropriate error value are identified as selected test cases and included within a group of target test cases for performing regression testing of the second version.

10 Claims, 6 Drawing Sheets

(56) References Cited

U.S. PATENT DOCUMENTS

| | | | | |
|---|---|---|---|---|
| 11,494,289 | B2 * | 11/2022 | Bhatia | G06F 11/2284 |
| 2009/0249301 | A1 * | 10/2009 | Kalla | G06F 11/3668 717/127 |
| 2014/0289564 | A1 * | 9/2014 | Rugina | G06F 11/0793 714/38.1 |
| 2015/0363198 | A1 * | 12/2015 | Yang | G06F 8/53 717/106 |
| 2016/0147517 | A1 * | 5/2016 | Vicovan | G06F 11/3636 717/136 |
| 2018/0060221 | A1 * | 3/2018 | Yim | G06F 9/44536 |
| 2022/0164446 | A1 * | 5/2022 | Yi | G06F 21/577 |
| 2022/0194775 | A1 * | 6/2022 | Friedel | G06Q 20/3278 |
| 2024/0193076 | A1 * | 6/2024 | Chen | G06F 11/3688 |
| 2024/0232050 | A1 * | 7/2024 | Nair | G06F 11/3664 |

OTHER PUBLICATIONS

Pastore, Fabrizio, et al. "Verification-aided regression testing." Proceedings of the 2014 International Symposium on Software Testing and Analysis. 2014. (Year: 2014).*

Guthoff, Jens, and Volkmar Sieh. "Combining software-implemented and simulation-based fault injection into a single fault injection method." Twenty-Fifth International Symposium on Fault-Tolerant Computing. Digest of Papers. IEEE, 1995. (Year: 1995).*

Muench, Marius. Dynamic binary firmware analysis: challenges & solutions. Diss. Sorbonne Université, 2019. https://theses.hal.science/tel-03143960v1/document, retrieved Jun. 5, 2026. (Year: 2019).*

* cited by examiner

```
/////////////////////////////////////////////////////////////////////////////////
///
/// @brief  TtlAmbient_GetTemperature()
///         Get the ambient temperature
///
/// @param  temp_celsius - Pointer to ambient temperature reading
///
/// @return EMC_ERRORS_T - EMC_SUCCESS on success ~ 501
///
/////////////////////////////////////////////////////////////////////////////////
EMC_ERRORS_T TtlAmbient_GetTemperature( int32_t *temp_celsius )
{
    EMC_ERRORS_T status, mp_status, sp_status;
    int32_t temperature, mp_temperature;
    bool sp_trusted, mp_trusted, sp_valid, mp_valid;
    uint32_t platform_id;

    if( !temp_celsius )
    {
        return EMC_ERR_NULL;
    }

    platform_id = TtlSyscfg_GetPlatformId();
    switch( platform_id )
    {
        case PF_WARNADO_2U2N:
        case PF_WARNADO_2U2N_REVB:
        case PF_WARNADO_2U1N:
```

500

FIG. 5

```
Dump of assembler code for function TtlAmbient_GetTemperature:
  ...
  0x000e0060 <+1676>:  06 00 00 ea    b      0xe0080 <TtlAmbient_GetTemperature+1708>
  0x000e0064 <+1680>:  0a 30 5b e5    ldrb   r3, [r11, #-10]
  0x000e0068 <+1684>:  00 00 53 e3    cmp    r3, #0
  0x000e006c <+1688>:  03 00 00 0a    beq    0xe0080 <TtlAmbient_GetTemperature+1708>
  0x000e0070 <+1692>:  20 20 1b e5    ldr    r2, [r11, #-32] ; 0xffffffe0
  0x000e0074 <+1696>:  28 30 1b e5    ldr    r3, [r11, #-40] ; 0xffffffd8
  0x000e0078 <+1700>:  00 20 83 e5    str    r2, [r3]
  0x000e007c <+1704>:  03 00 00 ea    b      0xe0090 <TtlAmbient_GetTemperature+1724>
  0x000e0080 <+1708>:  02 00 00 ea    b      0xe0090 <TtlAmbient_GetTemperature+1724>
  0x000e0084 <+1712>:  17 30 a0 e3    mov    r3, #23
  0x000e0088 <+1716>:  08 30 0b e5    str    r3, [r11, #-8]
  0x000e008c <+1720>:  00 00 a0 e1    nop                  ; (mov r0, r0)
  0x000e0090 <+1724>:  08 30 1b e5    ldr    r3, [r11, #-8]
  0x000e0094 <+1728>:  03 00 a0 e1    mov    r0, r3
  0x000e0098 <+1732>:  04 d0 4b e2    sub    sp, r11, #4
  0x000e009c <+1736>:  00 88 bd e8    pop    {r11, pc}
  0x000e00a0 <+1740>:  cc 52 3b 00    eorseq r5, r11, r12, asr #5
  0x000e00a4 <+1744>:  58 ba 2b 00    eoreq  r11, r11, r8, asr r10
  0x000e00a8 <+1748>:  c4 52 3b 00    eorseq r5, r11, r4, asr #5
```

ARM register “r0” stores return value loader wll change to “mov r0,#1”

601

602

603

600

FIG. 6

METHOD FOR EFFICIENTLY IMPROVING TEST CASE COVERAGE AND ROBUSTNESS

TECHNICAL FIELD

The present disclosure pertains to information handling systems and resources and, more specifically, automated regression testing of firmware following changes.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware, software, and firmware components that may be configured to process, store, and communicate information and may include one or more computer systems, data storage systems, and networking systems.

Automated regression testing is a known approach for ensuring that approved firmware continues to function as expected whenever the firmware is updated, revised, or otherwise modified. Each new version or release of firmware typically includes one or more added features, one or more bug fixes, or both. Regression testing is performed to detect errors or other unintended issues that revised firmware might cause or exhibit. While it may be theoretically possible to test every possible combination of firmware state and input/output (I/O) event, time and cost considerations typically impose appreciable constraints on the total number of test cases that can be performed. In addition, because failures are always predictably reproducible, it is frequently necessary or highly desirable to execute test cases two or more times, potentially under two or more different test configurations to diagnosis root causes of failures accurately. Thus, it is important to select test cases wisely to achieve an effective balance between coverage and efficiency.

Generally, however, it is difficult to quantify how many code changes are covered by a black box test case. Those experienced and skilled in regression testing and familiar with a particular piece of firmware may be able to select suitable tests manually, but manual test case selection is imprecise and may fail to reveal one or more issues. Test cases may be selected based on code coverage data, e.g., statement/line coverage, branch/edge coverage, but coverage driven test selection can result in drift over time. In addition, code coverage tools typically consume considerable central processing unit (CPU), memory, and storage resources, which may impact the software's behavior and is not suitable for embedded and other resource-scarce environments.

SUMMARY

Common problems associated with selecting test cases for regression testing are addressed by disclosed systems and methods for improving test efficiency and test correctness. Disclosed solutions may be implemented advantageously in numerous applications and environments including, as a non-limiting example, a quick, interactive qualification cycle.

In at least one aspect, subject matter included below discloses methods and systems for selecting test cases in which differences between first and second versions of firmware or another type of software are determined. In some cases, the first version corresponds to a version currently in use while the second version represent an update to the first version, including one or more bug fixes and/or additional features. Based at least in part on the differences between the two versions, one or more functions most likely to be impacted by the update are identified. These functions are referred to herein as impacted functions. Disclosed methods and system may then modify binary code for the second firmware version to cause the one or more impacted functions, when called, to return unconditionally a predetermined error value. With the firmware thus modified, a plurality of test cases are executed one time. Any test cases failing with the appropriate error value are identified as selected test cases and included within a group of target test cases for performing regression testing of the second version.

The test cases selection operations may further include accessing mapping data indicative of existing associations between functions and test cases and excluding, from the plurality of test cases run on the modified binary code, existing test cases, i.e., any test case indicated by the mapping data as having an existing association with any of the one or more impacted functions. In such embodiments, the target test cases may include a combination of the existing test cases and the selected test cases.

In at least some embodiments, modifying the binary code may include determining, for each impacted function, configuration information indicating a return type (RTYPE) of the impacted function and an instruction location (ILOC) for an instruction that loads a return value for the function to a return value register. RTYPE determinations may be performed by static analysis of source code.

For ARM CPU architecture embodiments, the return value register may be the r0 register while, for Intel CPU architecture embodiments, the eax register may be the return value register. Based on the RTYPE and the applicable CPU architecture of the device under test, instruction data (IDATA) for loading the return value register with a predetermined error value may be determined. The IDATA may then be used to overwrite the binary code at the ILOC. Prior to overwriting the binary code at the ILOC, the original binary code at the ILOC may be read and stored to enable a subsequent roll back of the binary code at the ILOC.

In some embodiments, modifying the binary code is performed by a custom loader implemented in a baseboard management controller of an information handling system. Determining the ILOC may include calculating an offset for the function, based on debug information generated by a compiler, to locate binary code corresponding to the function. The function's binary code may then be disassembled and the disassembled code may be used to identify the last instruction in the function storing a value to the function return register.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 5 illustrates an exemplary function suitable for use in conjunction with disclosed teachings;

FIG. 6 illustrates exemplary assembly code for the function of FIG. 5.

DETAILED DESCRIPTION

Figure 1:
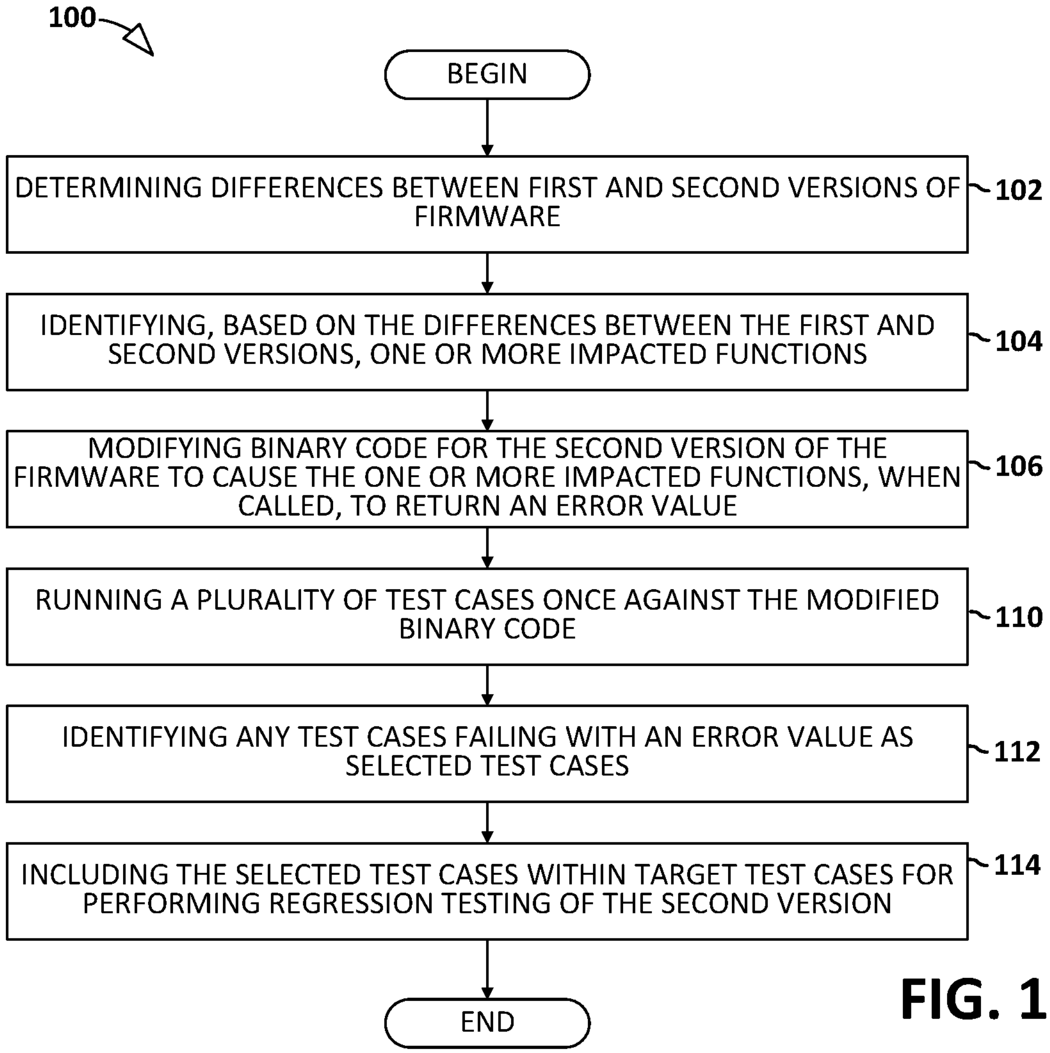
FIG. 1 illustrates a flow diagram of a method for selecting test cases in accordance with disclosed teachings.

Exemplary embodiments and their advantages are best understood by reference to FIGS. 1-7, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a flow diagram of a method 100 for selecting test cases to be used for regression testing of firmware or any other suitable type of information handling system software. The method 100 illustrated in FIG. 1 describes method 100 in the context of selecting test cases for regression testing following a firmware update or revision. In this context, the illustrated description of method 100 refers to two versions or releases of a firmware resource. The two versions may be referred to generically as a first version and a second version. In at least some embodiments, the first version corresponds to a known, confirmed, and typically earlier version of the firmware resource while the second version corresponds to a revised and/or updated and typically later version of the firmware resource. It should be noted that although method 100 is described with respect to the firmware update context suggested by FIG. 1, method 100 is applicable in other contexts including, as a non-limiting example, contexts involving software other than firmware.

As depicted in FIG. 1, method 100 begins by determining (operation 102) differences between first and second versions of a firmware resource or firmware code, referred to herein simply as firmware or the firmware. In the context of method 100, firmware may be characterized as code that invokes various functions, each of which produces some type of result. In at least some embodiments, firmware updates tend to have a non-uniform impact on the various functions invoked by the firmware. For example, a firmware update may comprise an incremental change intended to address a particular issue encountered in conjunction with a particular function or a particular group of functions. In such cases, any unanticipated issues introduced by the firmware update are more likely to appear in connection with the function or group of functions and, accordingly, regression testing of the firmware update may reasonably focus on the functions most likely to have been impacted by the firmware update. Based on the differences between the first and second firmware versions, the method 100 illustrated in FIG. 1 identifies (operation 104) a subset of the firmware's functions and, more specifically, one or more of the firmware's functions that are most likely to have impacted by the firmware update. For the sake of brevity, this subset of the firmware's functions may be referred to herein as the impacted functions.

Disclosed methods and systems may select suitable test cases by identifying test cases that call or otherwise produce interactions with the impacted functions. As depicted in FIG. 1, method 100 identifies these test cases by modifying (operation 106) binary code for the second version of the firmware to cause the impacted functions, when called, to return an error value. Forcing the impacted functions to return an error value facilitates the identification of test cases that exercise the impacted functions. As depicted in FIG. 1, method 100 proceeds by running (operation 110) each of a potentially large number of available test cases one time and then simply identifying any test cases that failed with an appropriate error value, i.e., identifying any test cases that invoked or otherwise triggered one or more of the impacted functions. The group of tests cases revealed by operation 112 are referred to herein as the selected test cases. The method 100 illustrated in FIG. 1 then includes the selected test cases in a group of test cases referred to herein as the target test cases, which represent test cases that may be used for subsequent regression testing.

As described below in conjunction with FIG. 2, the target test cases may include, in addition to the selected test cases identified in operation 112, test cases that were previously known to have an association or relationship with one or more of the impacted functions. In such cases, the test cases executed during operation 110 may be filtered to exclude any tests cases that have already been associated with any of the impacted functions.

Figure 2:
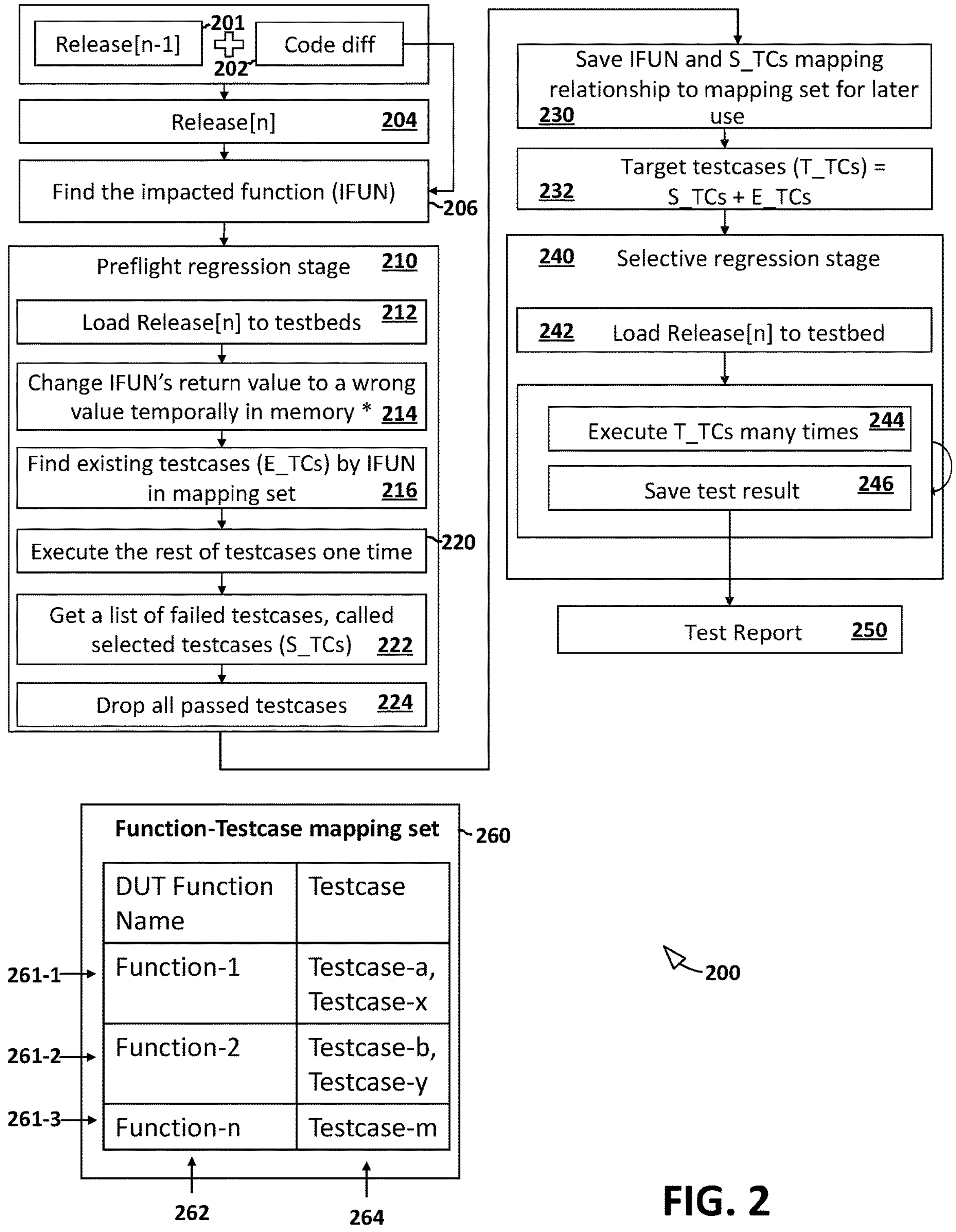
FIG. 2 illustrates an implementation of the test case selection method of FIG. 1.

Turning now to FIG. 2, a flow diagram 200 illustrates an exemplary implementation of a method, such as method 100 (FIG. 1), for selecting test cases. As depicted in FIG. 2, the firmware versions referenced in the description of method 100 (FIG. 1) are referred to as versions in FIG. 2 and the impacted functions described in FIG. 1 are referred to as IFUNs.

As depicted in FIG. 2, method 200 is applied to two consecutive firmware releases identified as release[n−1] 201 and release[n] 204. FIG. 2 further illustrates that release[n] 204 is the result of modifications, represented in FIG. 2 as code differences 202, made to release[n−1] 201.

The method 200 illustrated in FIG. 2 determines (operation 206) the impacted functions (IFUNs) based on the code differences 202, i.e., based on the modifications required to transform release[n−1] 201 to release[n] 204. The method 200 depicted in FIG. 2 then performs preflight regression stage operations 210. The preflight regression stage operations 210 illustrated in FIG. 2 begin by loading (operation 212) release[n] to one or more testbeds. In at least some embodiments, loading a release to a testbed is accomplished by loading executable binary code for the release into a memory resource, e.g., dynamic random access memory (DRAM) and/or static random access memory (SRAM) of an information handling resource.

Having already identified the IFUNs, method 200 then changes (operation 214) the return value generated by each IFUN to a "wrong" value, i.e., an error value that will be used to easily identify test cases that exercised the applicable IFUN. As depicted in FIG. 2, the IFUNs are modified by modifying the actual binary code stored in volatile memory for storing executable instructions. In other embodiments, IFUNs may be altered to produce error return values in other ways such as modifying source code and recompiling.

The illustrated method 200 is configured for use in conjunction with mapping data identified as function-testcase mapping set 260, which includes a plurality of entries 261, of which FIG. 2 depicts three such entries 261-1, 261-2, and 261-3, each of which includes a function field 262 and a test case field 264. Mapping set 260 may be maintained to record known associations between test cases and functions.

The illustrated method 200 uses mapping set 260 to identify (operation 216) existing test cases, i.e., test cases that have previously been determined to have an association with any of the IFUNs under consideration. Method 200 then executes the remaining test cases, i.e., all test cases other than the existing test cases identified in operation 216, one time. Because these test cases are executed with the modified IFUNs, all test cases that exercise any one or more of the IFUNs return with an error value that is used to identify a list of (operation 222) the failing test cases. Because the failing test cases identified in operation 222 represent test cases that exercise one or more IFUNs, these test cases are identified as selected test cases, i.e., test cases that might be usefully including in regression. As depicted in FIG. 2, all test cases that do not fail are dropped (operation 224) from consideration for use in regression testing. In this manner, the identifies of test cases that exercise functions of interest for any release are reliably and automatically identified.

The illustrated method then saves (operation 230) information mapping the selected test cases identified in operation 222) and their corresponding IFUNs in the mapping set 260 for use in evaluating subsequent firmware releases. Method 200 may then define the target test cases for regression testing by combining (operation 232) the selected test cases identified in operation 222 with the existing test cases identified in operation 216.

After establishing the target test cases, the method 200 illustrated in FIG. 2 performs selective regression operations 240 by first loading (operation 242) a clean and unmodified version of release[n] (204) to the testbed and then repeatedly executing (operation 244) the target test cases and saving (operation 246) the test results. The method 200 illustrated in FIG. 2 then concludes with the generation of a test report 250 capturing and summarizing the results. By limiting the target test cases to only those test cases that have exhibited a relationship with the functions most likely to have been impacted by a firmware release, the illustrated method beneficially improves the regression testing efficiency. For a given amount of testing time, relevant test cases can be executed more times. Alternatively, a desired number of test cases executions can be performed more quickly.

Figure 3:
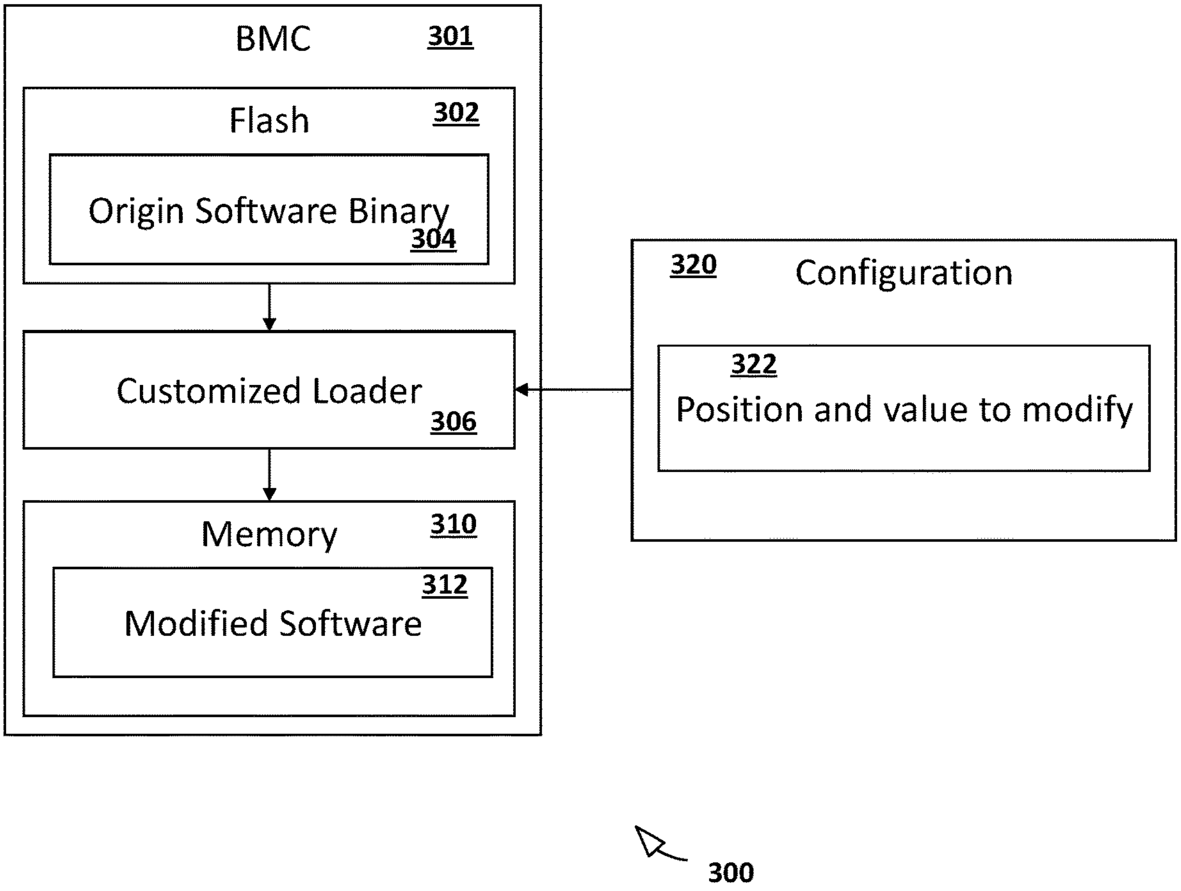
FIG. 3 illustrates an implementation of a customized loader suitable for use in conjunction with disclosed test case selection methods.

Referring now to FIG. 3, an implementation of a customized loader 306 suitable for use in conjunction with disclosed features for modifying the return value of impacted functions by modifying binary code stored. As depicted in FIG. 3, the customized loader 306 is implemented with a baseboard management controller (BMC) 301 of an information handling system. The illustrated BMC 301 includes a flash memory 302 and a volatile memory 310. The original binary code 304 for the applicable firmware release is stored in flash memory 302 and the modified binary code is stored in volatile memory 310.

The customized loader 306 operates in conjunction with a configuration file 320 which includes information indicating positions, i.e., memory addresses, and values to modify to produce modified software 312. With this technique of modifying the software in situ, i.e., directly in memory, enables the modifications to made without impacting performance, without requiring a recompile, and without requiring any substantial storage or processing resources apparat from the comparatively modest storage resources required for the configuration file 320.

Figure 4:
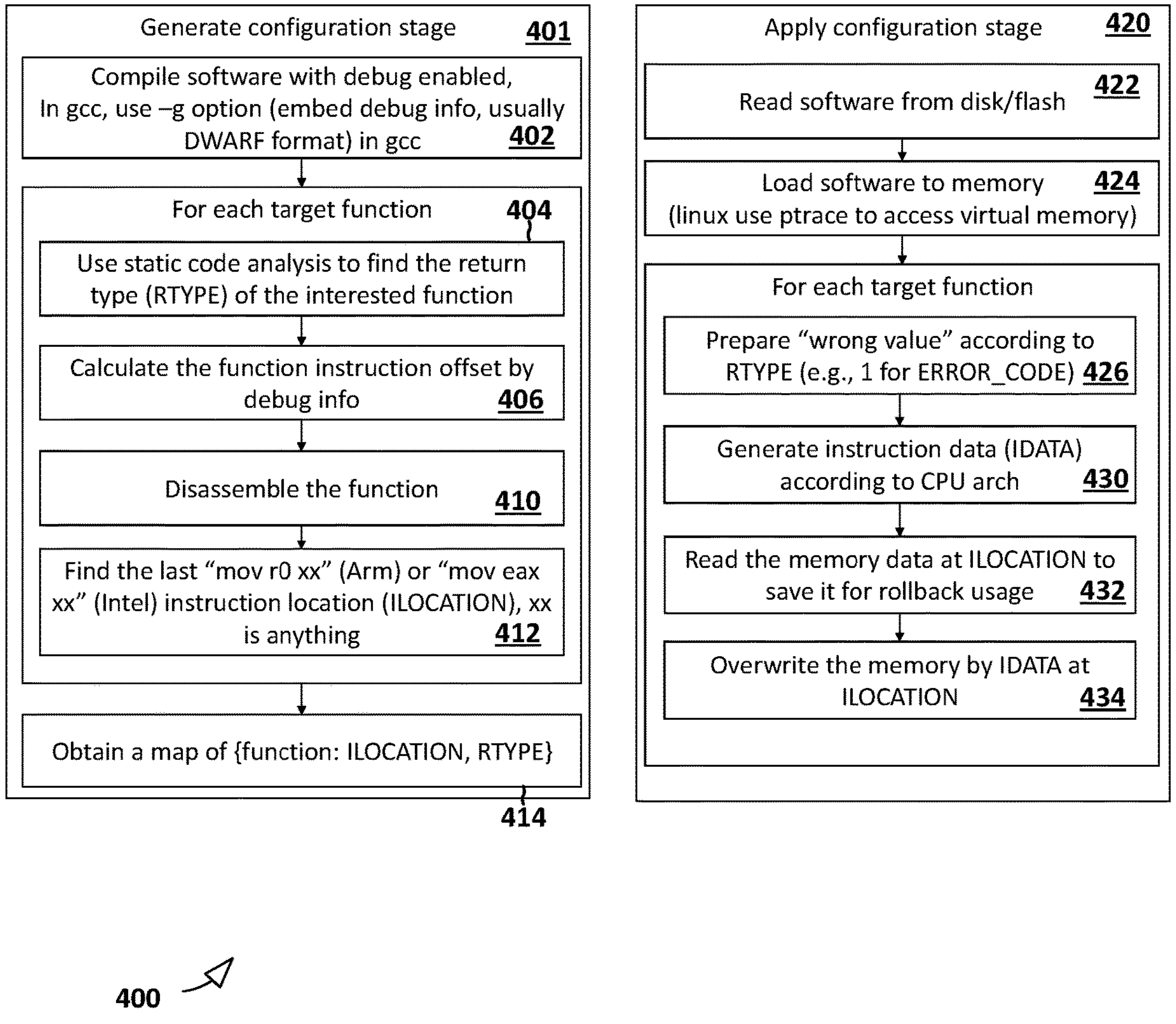
FIG. 4 illustrates a flow diagram for a method of modifying binary code in accordance with disclosed teachings.

Turning now to FIG. 4, a method 400 suitable for generating and applying the configuration file 320 (FIG. 3) used by customized loader 306 to perform the in situ modification of binary code for a software release is depicted. As depicted in FIG. 4, method 400 includes a first stage, identified in FIG. 4 as generate configuration stage 401, which begins by compiling (operation 402) software source code and, more specifically, compiling the code with the compiler's debug option enabled. In the case of a GCC (GNU compiler collection) compiler, for example, embedded debug information is typically enabled by including the –g option in the applicable command line.

The method 400 illustrated in FIG. 4 then performs a set of operations 404 through 414 iteratively for each target function in the software. Operation 404 employs static code analysis to identify the return type (RTYPE) of the target function being processed. The embedded debug information is then used to calculate (operation 406) the offset of the function instruction before disassembling (operation 410) the function, i.e., converting binary code to human readable assembler level code. Within the disassembled code, the method 400 illustrated in FIG. 4 finds (operation 412) the instruction location (ILOC) of the last occurrence of an instruction referred to herein as a load return value instruction. The load return value instruction corresponds to the last instruction that loads a register for conveying a function's return value. The specific register employed may be platform specific. For example, an ARM architecture embodiment may employ register r0 while an Intel architecture embodiment may employ register EAX for conveying a function's return value. Thus, for an ARM architecture embodiment, operation 412 may identify the ILOC of the last instruction of the form "mov r0 xx" while, for an Intel architecture embodiment, operation 412 may identify the ILOC of the last instruction of the form "move eax xx).

By repeating operations 404 through 412, the illustrated method 400 may obtain (operation 414) mapping data for the configuration file to be used by the customized loader (as described above with respect to FIG. 3). The mapping data constructed in this manner may include entries for each target function wherein each entry includes the ILOC and RTYPE.

With the mapping data constructed, the illustrated embodiment of method 400 may then perform a second stage, identified in FIG. 4 as the apply configuration stage 420, to perform the direct memory modification of a software release. The apply configuration stage 420 illustrated in FIG. 4 begins by reading (422) the software from disk/storage and loading (424) the software to memory. The method 400 illustrated in FIG. 4 then performs a sequence of operations 426-434 for each target function. During operation 426, a wrong value, i.e., a predetermined error value, is determined in accordance with the target function's RTYPE and the instruction code data (IDATA) appropriate for the applicable CPU architecture (e.g., ARM vs. Intel) is generated. Before writing the IDATA and the error value into memory, the existing value of the applicable memory locations are read and stored to support a rollback to original conditions. After preserving the original data, the illustrated method 400 then writes the IDATA to the ILOC to complete the modification.

FIG. 5 illustrates source code for an exemplary function 500 suitable for use in conjunction with disclosed methods and systems while FIG. 6 illustrates assembly code 600 for function 500. In at least some embodiments, assembly code 600 is generated with a tool for disassembling binary code stored in a memory resource. The assembly code 600 depicted in FIG. 6 includes debug information include instruction addresses information 602 and instruction offsets 603. In accordance with disclosed teachings, at least one embodiment locates the return value instruction 601, which is the last instruction to load a value into the register typically used as the return value register in accordance with the specific CPU architecture (e.g., register r0 for ARM CPU architecture and register eax for Intel CPU architecture). Thus, in the case of an ARM CPU architecture, disclosed methods and systems, after identifying instruction 601 as the return value instruction for the corresponding function may perform the operations described in conjunction with FIG. 4 to change the return value instruction from "mov r0, xx" to "mov r0, #1" for an example in which the designated error value is 1.

Figure 7:
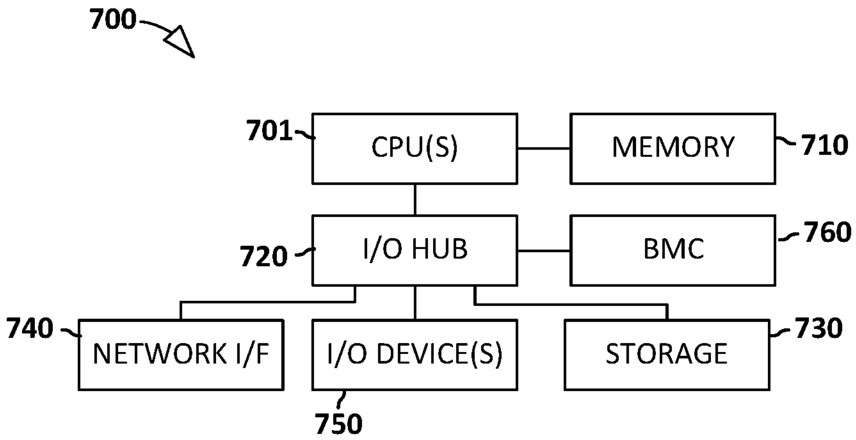
FIG. 7 illustrates an exemplary information handling system suitable for use in conjunction with subject matter disclosed in FIG. 1 through FIG. 6 and the accompanying description.

Referring now to FIG. 7, any one or more of the elements illustrated in FIG. 1 through FIG. 6 may be implemented as or within an information handling system exemplified by the information handling system 700 illustrated in FIG. 7. The illustrated information handling system includes one or more general purpose processors or central processing units (CPUs) 701 communicatively coupled to a memory resource 710 and to an input/output hub 720 to which various I/O resources and/or components are communicatively coupled. The I/O resources explicitly depicted in FIG. 7 include a network interface 740, commonly referred to as a NIC (network interface card), storage resources 730, and additional I/O devices, components, or resources 750 including as non-limiting examples, keyboards, mice, displays, printers, speakers, microphones, etc. The illustrated information handling system 700 includes a baseboard management controller (BMC) 760 providing, among other features and services, an out-of-band management resource which may be coupled to a management server (not depicted). In at least some embodiments, BMC 760 may manage information handling system 700 even when information handling system 700 is powered off or powered to a standby state. BMC 760 may include a processor, memory, an out-of-band network interface separate from and physically isolated from an in-band network interface of information handling system 700, and/or other embedded information handling resources. In certain embodiments, BMC 760 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A test case selection method, comprising:

determining differences between first and second versions of firmware;

identifying, based on the differences between the first and second versions, one or more impacted functions;

reading, by a customized loader implemented in a baseboard management controller (BMC), original binary code for the second version from a non-volatile memory of the BMC;

loading binary code for the second version of firmware into a random access memory of a device under test;

modifying the binary code for the second version of firmware in situ in the random access memory of the device under test to cause the one or more impacted functions, when called, to return an error value, wherein modifying the binary code comprises:

determining, by the customized loader operating in conjunction with a configuration file indicating memory positions and corresponding values to modify, for each impacted function of the one or more impacted functions, configuration information indicative of:

a return type (RTYPE) of the respective impacted function; and an instruction location (ILOC) for an instruction loading a return value to a return value register;

determining, based on the RTYPE and a central processing unit (CPU) architecture of the device under test, instruction data (IDATA) for loading the return value register with the error value;

prior to overwriting the binary code at the ILOC, reading the binary code at the ILOC and storing the binary code for subsequently rolling back the binary code at the ILOC;

overwriting the binary code at the ILOC with the IDATA;

running a plurality of test cases once on the modified binary code;

identifying any test cases returning the error value as selected test cases; and including the selected test cases within target test cases for performing regression testing of the second version;

accessing mapping data indicative of existing associations between functions and the selected test cases; and excluding, from the plurality of test cases run on the modified binary code, existing test cases, comprising any test case indicated by the mapping data as having an existing association with any of the one or more impacted functions.

2. The method of claim 1, further comprising:

including the existing test cases within the target test cases.

3. The method of claim 1, wherein determining the configuration information comprises determining the RTYPE based on static analysis of source code for the second version of firmware.

4. The method of claim 1, wherein determining the configuration information comprises determining the ILOC by:

calculating an offset for the one or more impacted functions from debug information generated by a compiler to locate binary code corresponding to the one or more impacted functions;

disassembling the binary code for the one or more impacted functions into assembler code; and identifying a last instruction in the one or more impacted functions storing a value to the return value register.

5. The method of claim 4, wherein the CPU architecture and the corresponding return value register are selected from:

an ARM™ CPU architecture and an r0 register; and an Intel™ CPU architecture and an eax register.

6. An information handling system comprising:

a central processing unit (CPU); and a memory, accessible to the CPU, including processor executable instructions that, when executed by the CPU, cause the system to perform test case selection operations comprising:

determining differences between first and second versions of firmware;

identifying, based on the differences between the first and second versions, one or more impacted functions;

reading by a customized loader implemented in a baseboard management controller (BMC), original binary code for the second version from a non-volatile memory of the BMC;

loading binary code for the second version of firmware into a random access memory of a device under test;

modifying the binary code for the second version of firmware in situ in the random access memory of the device under test to cause the one or more impacted functions, when called, to return an error value, wherein modifying the binary code comprises:

determining, by the customized loader operating in conjunction with a configuration file indicating memory positions and corresponding values to modify, for each impacted function of the one or more impacted functions, configuration information indicative of:

a return type (RTYPE) of the respective impacted function; and an instruction location (ILOC) for an instruction loading a return value to a return value register;

determining, based on the RTYPE and a CPU architecture of the device under test, instruction data (IDATA) for loading the return value register with the error value;

prior to overwriting the binary code at the ILOC, reading the binary code at the ILOC and storing the binary code for subsequently rolling back the binary code at the ILOC; and overwriting the binary code at the ILOC with the IDATA;

running a plurality of test cases once on the modified binary code;

identifying any test cases returning the error value as selected test cases; and including the selected test cases within target test cases for performing regression testing of the second version;

accessing mapping data indicative of existing associations between functions and the selected test cases; and excluding, from the plurality of test cases run on the modified binary code, existing test cases, comprising any test case indicated by the mapping data as having an existing association with any of the one or more impacted functions.

7. The information handling system of claim 6, wherein the test case selection operations further include:

including the existing test cases within the target test cases.

8. The information handling system of claim 6, wherein determining the configuration information comprises determining the RTYPE based on static analysis of source code for the second version of firmware.

9. The information handling system of claim 6, wherein determining the configuration information comprises determining the ILOC by:

calculating an offset for the one or more impacted functions from debug information generated by a compiler to locate binary code corresponding to the one or more impacted functions;

disassembling the binary code for the one or more impacted functions into assembler code; and identifying a last instruction in the one or more impacted functions storing a value to the return value register.

10. The information handling system of claim 9, wherein the CPU architecture and the corresponding return value register are selected from:

an ARM™ CPU architecture and an r0 register; and an Intel™ CPU architecture and an eax register.

* * * * *